March 30, 1926. 1,578,424
C. A. GODSHALK
MEANS FOR SECURING TOGETHER AGAINST ROTATION THE PARTS OF GEAR CASINGS
Filed Nov. 16, 1922 2 Sheets-Sheet 1

Inventor,
Clarence A. Godshalk.
By John V. Barker
Attorney

March 30, 1926. 1,578,424
C. A. GODSHALK
MEANS FOR SECURING TOGETHER AGAINST ROTATION THE PARTS OF GEAR CASINGS
Filed Nov. 16, 1922 2 Sheets-Sheet 2
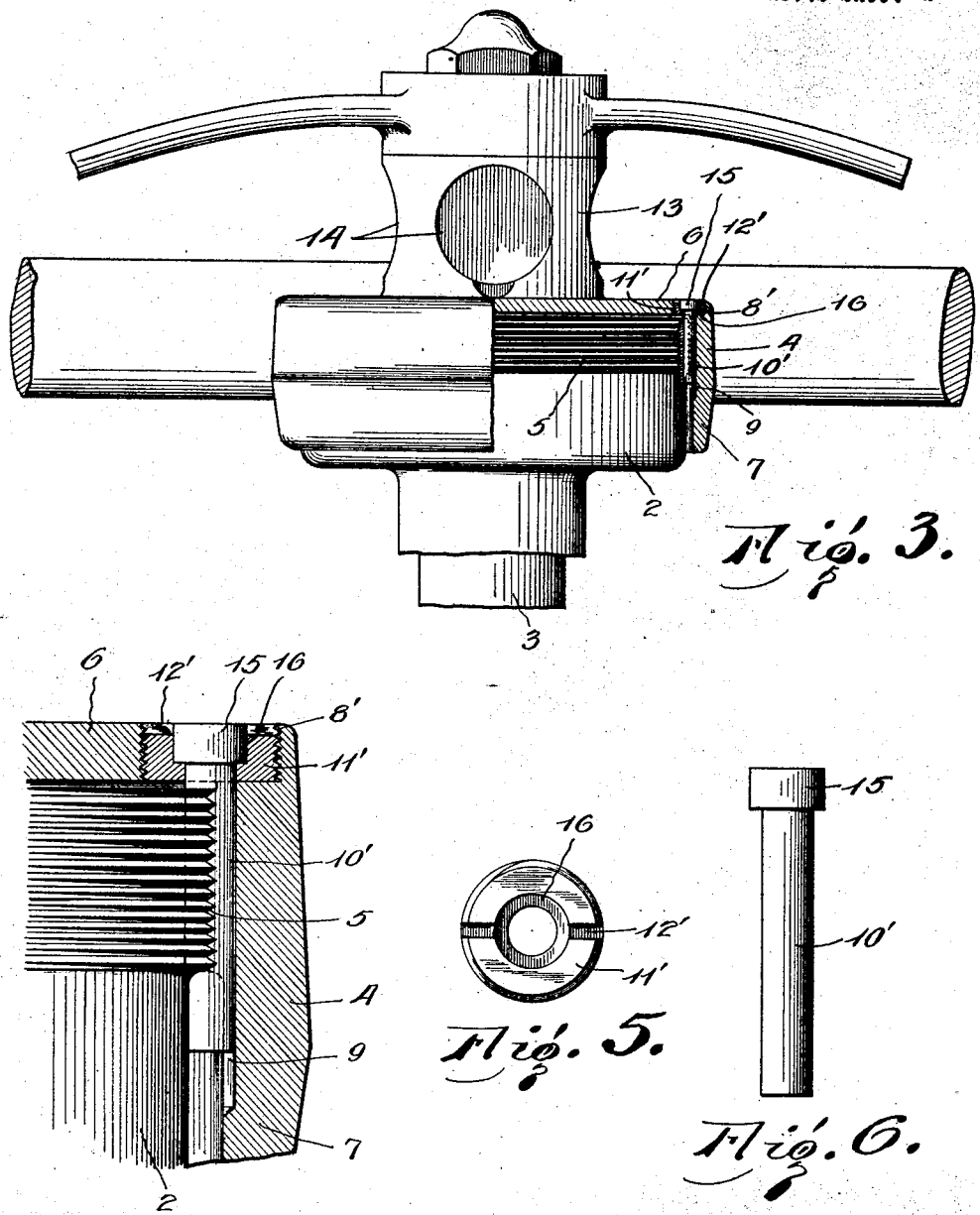
Inventor,
Clarence A. Godshalk.
By John S. Barker
Attorney Patented Mar. 30, 1926.

1,578,424

UNITED STATES PATENT OFFICE.

CLARENCE A. GODSHALK, OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE.

MEANS FOR SECURING TOGETHER AGAINST ROTATION THE PARTS OF GEAR CASINGS.

Application filed November 16, 1922. Serial No. 601,367.

*To all whom it may concern:*

Be it known that I, CLARENCE A. GODSHALK, a citizen of the United States, residing at Philadelphia, in the county of Philadelphia and State of Pennsylvania, have invented certain new and useful Improvements in Means for Securing Together Against Rotation the Parts of Gear Casings, of which the following is a specification.

There are now being placed upon the market various devices for locking the steering wheels of automobiles provided with the "Ford" type of steering mechanism. These are distributed and sold as automobile accessories and are applied to cars which have been originally equipped with the ordinary non-locking type of steering wheel. An element of such locking means is a cap that replaces the ordinary cap of the gear case at the upper end of the steering column, so constructed as to serve as the stationary element with which the locking bolt engages. This arrangement makes it necessary that the gear-case cap be locked or secured against rotation, else when the steering wheel is locked to the said cap the latter may be turned upon the thread that unites it with the gear-case. Two methods of securing the specially constructed gear-case cap of an automobile wheel lock to the body of the gear-case are now in common practice. One is to unite them by screw-threaded bolts, which necessitates drilling and screw-threading apertures in the gear-case to receive the bolts; and the other is to use smooth locking pins, instead of screw-threaded bolts, but these, once being driven into place, are difficult, if not impossible, to remove.

My invention has for its object to provide means for securing the cap of a gear case of an automobile steering mechanism against rotation, which means may be easily and quickly applied, and also may be easily removed when it becomes desirable to take off the cap and open up the gear-case. The invention is particularly adapted for the use just referred to, but is not limited in its practical applications to that particular use.

In the accompanying drawing,—

Fig. 3 is a view similar to Fig. 1 illustrating a second form of my invention.

Figure 1:
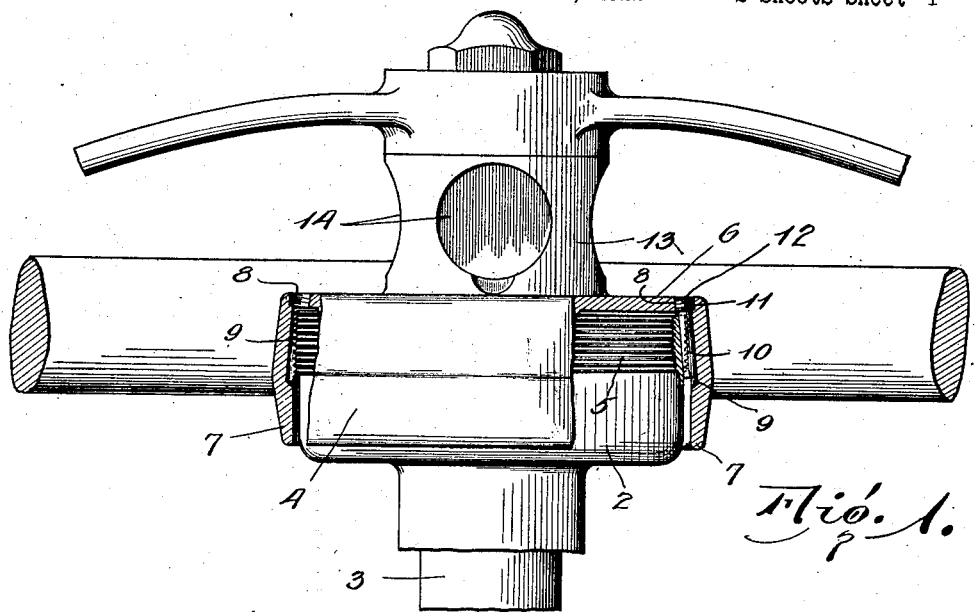
Fig. 1 is an elevation, partly in section, of the case and cap enclosing the steering gear of an automobile of the "Ford" type, the cap being constructed to serve as part of a lock for the steering wheel, the cap and case being rigidly secured together against rotative movement according to one form of my invention.

Figs. 4, 5, and 6 are detail views further illustrating the invention as shown in Fig. 3.

Referring to the drawings, 2 designates the case located at the top of the steering post 3 that encloses and protects the steering gear of a "Ford" type steering mechanism for an automobile. 4 designates the cap that closes the upper open end of the gear-case, the two being united by screw threads 5. The cap is formed with an attachment 13 that constitutes part of a steering-wheel locking mechanism, this being of usual or preferred construction. In the present illustration it is represented as being a hub projecting from the outer face of the top 6 of the gear-case cap and adapted to surround the rotatable shaft to which the steering wheel is attached in the usual manner, there being formed in this hub a series of recesses 14 adapted to receive a locking bolt carried by the steering wheel. The parts of this locking mechanism just referred to are not shown, except the part 13 carried by the gear-case cap, as the lock forms no part of my present invention.

It will be understood that the cap 4 is part of the lock equipment, which is usually sold as an accessory and is adapted to be applied to the gear case 2 of any Ford car, replacing the cap which was a part of the original installation. In the top plate 6 of the cap are formed one or more screw-threaded openings 8, four being represented, and these communicate with grooves 9 cut in the inner face of the skirt 7 of the cap to constitute partial pin seats. The axis of an opening 8 and its communicating groove 9 is inclined to the screw-threaded portion of the cap, the grooves 9 flaring outwardly from the screw-threaded openings to their inner or lower ends.

10, 10 are pins adapted to be seated in the grooves 9 and serving to lock together the gear-case 2 and its cap 4, holding them against relative rotation. The pins shown in Fig. 1 are formed of hard steel and are preferably cylindrical with their outer ends somewhat enlarged and screw-threaded at 11 to fit the screw-threaded openings 8. The outer or screw-threaded ends of the pins have formed in them radial kerfs 12 to receive the end of a screw driver; while their inner ends are sharpened or shaped so they will cut channels in the screw-threaded portions of the metal of the softer gear-case as the pins are driven into the grooves 9, thus completing the pin seats. The part of the pin that is to occupy the groove 9 is straight and of uniform size in cross section from end to end. The groove 9 serves to hold and guide the pin and is so disposed with reference to the gear case 2 that as the pin is driven therein the front cutting edge of the latter overlies the edge of the gear case directly opposite the groove, so that as the pin is forcibly driven endwise into the groove, following and being guided by the latter, its forward cutting edge forms a kerf in the wall of the case 2, which is of soft metal as compared with the metal of the pin.

My invention is practiced as follows: The cap 4 is screwed onto the gear-case, replacing the cap of the original equipment. In making this attachment the person installing the lock does not have to exercise any care in having the openings 8 and grooves 9 register with any particular part of the stationary gear case. The cap is screwed on until it is tight. The workman then inserts a pin 10 into one of the openings 8 and drives it into place by means of a hammer the pin following the groove 9. The end of the hard steel pin will cut a groove in the screw-threaded face of the softer gear-case as the pin is driven into place, and finally, becoming seated, partly in the groove 9 and partly in the groove which it has just cut, will lock together the parts 3 and 4, preventing any relative rotation thereof. The angle of the groove 9, relative to the wall of the gear-case, and the depth of the groove, are such that at about the time the inner end of the screw-threaded portion 11 of the pin comes to the upper face of the top 6 of the cap the inner end of the pin comes out of the gear-case, or leaves the surface thereof, having then finished cutting the groove in the latter. Thereafter the progress of the pin in an inward direction is easy and is secured by turning the pin to cause its screw-threaded part 11 to engage with the threaded aperture 8. It will thus be seen that the only tools required to install the special cap are a hammer to drive the pins while they are shearing their ways along the face of the gear case and cutting grooves in which they are to lie, and a screw driver to finally seat them with their outer ends flush with the top plate 6 of the cap. Not only may the pins be easily applied as just described, but they may be easily removed, being started by the use of a screw driver, and then, when the screw-threaded ends 11 have disengaged the threaded openings in which they were seated, pulled out by means of a pair of pliers.

In Figs. 3, 4 and 5 I have illustrated a different embodiment of the invention. In these views the locking pins 10′ are represented as having separable screw-threaded heads 11′. The latter are in the form of short screw-threaded plugs adapted to be seated in the openings 8′ in the cap 4. In the outer end of the plug 11′ is formed a kerf 12′ to receive a screw driver. At one end of the pin 10′ is formed a head 15 adapted to enter and be seated in a recess 16 formed therefor in the plug 11′. The plug is centrally perforated to permit the pin to pass through it.

Figure 2:
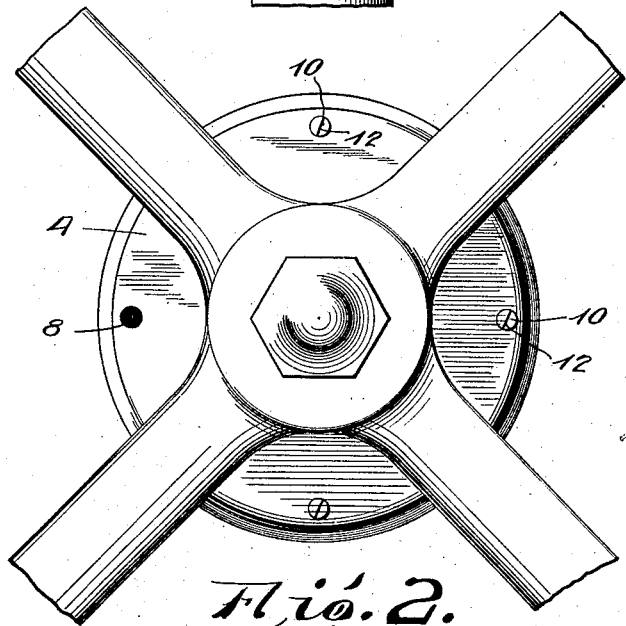
Fig. 2 is a plan view of the parts illustrated in Fig. 1.

The parts illustrated in Fig. 3 are installed as follows: The cap is screwed upon the gear-case in the same way as has been described in referring to the embodiment of the invention shown in Figs. 1 and 2. When this has been done the workman, by means of a hammer, drives the pins 10′ into place, and as this is done they cut seats for themselves in the softer metal of the gear-case. They are driven in until their heads 15 are properly seated in the plugs 11′; which then serve as enlarged screw-threaded heads for the pins. When it is desired to remove a pin the plug associated therewith is, by means of a screw driver, withdrawn from its seat in the top plate 6, drawing out with it the pin. When the plug disengages the cap the pin is sufficiently freed to permit it to be pulled out, by means of pliers or other tool. In this latter embodiment of my invention it is not necessary that the grooves 9 for the pins 10′, and the screw-threaded apertures for the plugs 11′, shall be inclined relative to the screw-threaded face of the gear-case as is represented in Fig. 1, because the pins are driven fully to place by the blows of a hammer, their final seating not being accomplished by the screw-threaded plugs 11′, these latter serving only to assist in the removal of the pins.

I have illustrated my invention as applied to the gear-case of an automobile steering mechanism, for which it has been particularly devised, but it will be apparent that the gear-case and the cap 4 therefor are typical of metal parts to be united and held against relative rotative movements by means such as I have described, and I therefore wish it to be understood that my invention is adapted for a wide variety of uses other than that herein illustrated and specifically described.

It will be seen by reference to the drawings that while the skirt of the cap of the gear case extends beyond the screw threads 5, the lower ends of the grooves constituting the seats for the locking pins are not closed, but are rather left open so that any chips of metal that may be formed during the insertion of the locking pins, or other particles of material that may be in the grooves, are allowed to escape and hence will not interfere with the complete seating of the pins with their heads flush or even a little below the upper surface of the top of the cap.

What I claim is:—

1. The combination with a case and a cover therefor, having screw-thread connection therewith, the end wall of the cover having a screw-threaded opening through it and there being formed in the inner wall of the skirt of the cover a groove constituting a partial pin seat, of means for preventing rotation of the cover upon the case, comprising a pin of hard metal adapted to be driven into the said partial pin seat and to cut a kerf in the opposite wall contiguous to said partial seat as it is being driven into place, the outer end of the pin lying in the said opening in the cover and having screw-thread connection therewith when in locking position.

2. The combination with two concentrically arranged cylindrical members one supported on the other, of means for preventing the relative rotation of such members, comprising a smooth locking pin adapted to be driven into and to fit a seat in the contiguous walls of the said concentric members, the outer end of the pin having screw thread connection with one of the members, the smooth part of the pin and the said screw-threaded connection thereof being separable from each other.

3. The combination with a case and a cover therefor having screw-threaded connection therewith, the end wall of the cover having formed in it a screw-threaded opening with which registers a groove formed in the skirt of the cover constituting a partial pin seat, of means for preventing rotation of the cover relative to the case, comprising a plug seated in the screw-threaded opening in the end of the cover, and a headed pin passing through the said plug and having a smooth portion adapted to enter the groove in the skirt of the cover and having its end adapted to cut a kerf in the wall of the case opposite the said groove as the pin is driven into the groove.

CLARENCE A. GODSHALK.